(12) United States Patent
Crisan et al.

(10) Patent No.: US 9,628,387 B2
(45) Date of Patent: Apr. 18, 2017

(54) NETWORK DATA CONGESTION MANAGEMENT PROBE SYSTEM

(71) Applicant: International Business Machines Corporation, Armonk, NY (US)

(72) Inventors: Daniel Crisan, Rueschlikon (CH); Casimer M. DeCusatis, Poughkeepsie, NY (US); Mitch Gusat, Langnau (CH); Cyriel J. A. Minkenberg, Gutenswil (CH)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 13/729,677

(22) Filed: Dec. 28, 2012

(65) Prior Publication Data

US 2013/0114412 A1    May 9, 2013

Related U.S. Application Data

(63) Continuation of application No. 12/765,637, filed on Apr. 22, 2010, now abandoned.

(51) Int. Cl.
*H04L 12/801* (2013.01)
*H04L 12/701* (2013.01)
(Continued)

(52) U.S. Cl.
CPC .............. *H04L 47/11* (2013.01); *H04L 45/00* (2013.01); *H04L 45/125* (2013.01);
(Continued)

(58) Field of Classification Search
None
See application file for complete search history.

(56) References Cited

U.S. PATENT DOCUMENTS

| 5,287,535 A | * | 2/1994 | Sakagawa ............. H04L 49/104 370/389 |
| 5,740,346 A | | 4/1998 | Wicki et al. ............. 395/182.02 |

(Continued)

FOREIGN PATENT DOCUMENTS

| CN | 1409526 A | 4/2003 | ........... H04L 12/703 |
| TW | 201016054 | 6/2005 | ............... H04L 1/12 |

(Continued)

OTHER PUBLICATIONS

Thodime et al., Dynamic Congestion-Based Load Balanced Routing in Optical Burst-Switched Networks, GLOBECOM 2003, pp. 2628-2632 (2003).

(Continued)

*Primary Examiner* — Chirag Shah
*Assistant Examiner* — Joshua Smith
(74) *Attorney, Agent, or Firm* — Ido Tuchman; Steven Chiu

(57) ABSTRACT

A method to investigate congestion in a computer network may include network devices to route data packets throughout the network. The method includes, for example, sending a probe packet to network devices from a source node to gather information about the traffic queues at each network device that is examined by the probe packet. A routing table at each network device that receives the probe packet is based on the gathered information for respective each traffic queue.

9 Claims, 8 Drawing Sheets

(51) Int. Cl.
*H04L 12/729* (2013.01)
*H04L 12/721* (2013.01)

(52) U.S. Cl.
CPC ............ *H04L 45/127* (2013.01); *H04L 45/26* (2013.01); *H04L 45/66* (2013.01)

(56) References Cited

U.S. PATENT DOCUMENTS

| | | | |
|---|---|---|---|
| 5,793,748 A * | 8/1998 | Murase | H04L 12/5602 370/235 |
| 5,793,976 A | 8/1998 | Chen et al. | 370/252 |
| 5,987,011 A | 11/1999 | Toh | 370/331 |
| 5,995,503 A * | 11/1999 | Crawley et al. | 370/351 |
| 6,075,769 A | 6/2000 | Ghanwani et al. | 370/232 |
| 6,134,218 A * | 10/2000 | Holden | H04L 12/5601 370/232 |
| 6,424,629 B1 * | 7/2002 | Rubino et al. | 370/241.1 |
| 6,587,434 B1 | 7/2003 | Cousins | 370/230 |
| 6,690,676 B1 | 2/2004 | Gulick | 370/458 |
| 6,839,767 B1 * | 1/2005 | Davies | H04L 47/10 370/230 |
| 6,956,867 B1 * | 10/2005 | Suga | H04L 47/10 370/465 |
| 7,403,496 B2 | 7/2008 | Bonta | 370/310 |
| 7,414,977 B2 | 8/2008 | Orlik et al. | 370/238 |
| 7,586,912 B2 | 9/2009 | Agarwal et al. | 370/389 |
| 7,675,857 B1 * | 3/2010 | Chesson | H04L 47/10 370/235 |
| 7,796,512 B2 | 9/2010 | Komiya et al. | 370/252 |
| 8,094,552 B1 | 1/2012 | Sachidanandam | 370/230 |
| 2002/0037003 A1 | 3/2002 | Windecker | 370/352 |
| 2002/0118641 A1 * | 8/2002 | Kobayashi | H04L 45/02 370/230 |
| 2002/0176363 A1 * | 11/2002 | Durinovic-Johri | H04L 45/00 370/237 |
| 2003/0134644 A1 | 7/2003 | Reed et al. | 455/453 |
| 2003/0218988 A1 * | 11/2003 | Han | H04L 45/02 370/254 |
| 2004/0028069 A1 * | 2/2004 | Tindal et al. | 370/429 |
| 2005/0190717 A1 | 9/2005 | Shu et al. | 370/328 |
| 2005/0232147 A1 | 10/2005 | Bang et al. | 370/229 |
| 2006/0013158 A1 * | 1/2006 | Ahuja et al. | 370/328 |
| 2006/0078008 A1 * | 4/2006 | Bordonaro | H04L 12/2602 370/522 |
| 2006/0176810 A1 | 8/2006 | Kekki | 370/229 |
| 2007/0091817 A1 | 4/2007 | Yoon et al. | 370/252 |
| 2008/0025299 A1 | 1/2008 | Agarwal et al. | 370/389 |
| 2008/0075003 A1 | 3/2008 | Lee et al. | 370/230 |
| 2008/0253299 A1 | 10/2008 | Damm et al. | 370/252 |
| 2009/0232018 A1 | 9/2009 | Chun et al. | 370/252 |
| 2009/0268612 A1 * | 10/2009 | Felderman | H04L 47/10 370/230 |
| 2010/0182907 A1 * | 7/2010 | Pinter et al. | 370/235 |
| 2010/0238803 A1 * | 9/2010 | Racz | H04L 47/10 370/235 |
| 2011/0110358 A1 | 5/2011 | Haartsen et al. | 370/350 |

FOREIGN PATENT DOCUMENTS

| | | | |
|---|---|---|---|
| TW | 201001986 | 1/2010 | ............ H04L 12/28 |
| WO | WO 2006008494 | 1/2006 | ............ H04L 12/00 |

OTHER PUBLICATIONS

Khan et al., "A Review of Gateway Load Balancing Strategies in Integrated Internet-MANET", IEEE, pp. 1-6 (2009).
International Search Report and Written Opinion for PCT Application PCT/EP2011/056364 dated Jun. 29, 2011.
Rafi U Zaman et al., "A review of gateway load balancing strategies in integrated internet-MANET" Proceeding IMSAA'09 Proceedings of the 3rd IEEE international conference on Internet multimedia services architecture and applications, pp. 291-296 (2009).
Kumar, Rakesh et al., "An Efficient Gateway Discovery in Ad Hoc Networks for Internet Connectivity" Conference on Computational Intelligence and Multimedia Applications, 2007, vol. 4, pp. 275-282.
Davide Cerri et al., Securing AODV: The A-SAODV Secure Routing Prototype, Security in Mobile Ad Hoc and Sensor Networks, IEEE Communications Magazine, pp. 120-125 (Feb. 2008).
Amita Rani et al., Performance Evaluation of Modified Aodv for Load Balancing, Journal of Computer Science, 3(11), pp. 863-868 (2007).

* cited by examiner

NETWORK DATA CONGESTION MANAGEMENT PROBE SYSTEM

CROSS-REFERENCE TO RELATED APPLICATIONS

This is a Continuation application to U.S. patent application Ser. No. 12/765,637 entitled "NETWORK DATA CONGESTION MANAGEMENT PROBE SYSTEM", filed Apr. 22, 2010, which application is incorporated herein by reference.

BACKGROUND

Field of the Invention

The invention relates to the field of computer systems, and, more particularly, to address data congestion and management of such.

Description of Background

Generally, conventional Ethernet fabrics are dynamically routed. In other words, packets are directed from one switch node to the next, hop by hop, through the network. Examples of protocols used include Converged Enhanced Ethernet (CEE), Fibre Channel over Converged Enhanced Ethernet (FCoCEE), and Data Center Bridging (DCB), as well as proprietary routing schemes.

SUMMARY

According to one embodiment of the invention, a method may further include organizing the network devices into a virtual local area network. The method may additionally include structuring the probe packets to include at least one of a layer 2 flag and sequence/flow/source node IDs.

The method may further include sending an extended queue status of at least one of the network devices to the source node in response to receiving the probe packet. The method may additionally include providing the extended queue status of a network device to other network devices in response to the network device receiving the probe packet.

The method may further comprise including at least one of the number of pings from any flow ID received since the last queue change, the number of packets forwarded since the last queue change, and pointers to a complete network device core dump as part of the extended queue status. The method may additionally include updating the routing table to rebalance traffic loads via the source node if the extended queue status exceeds a threshold level.

DETAILED DESCRIPTION

The invention will now be described more fully hereinafter with reference to the accompanying drawings, in which preferred embodiments of the invention are shown. Like numbers refer to like elements throughout, like numbers with letter suffixes are used to identify similar parts in a single embodiment, and letter suffix lower case n is a variable that indicates an unlimited number of similar elements.

Figure 1:
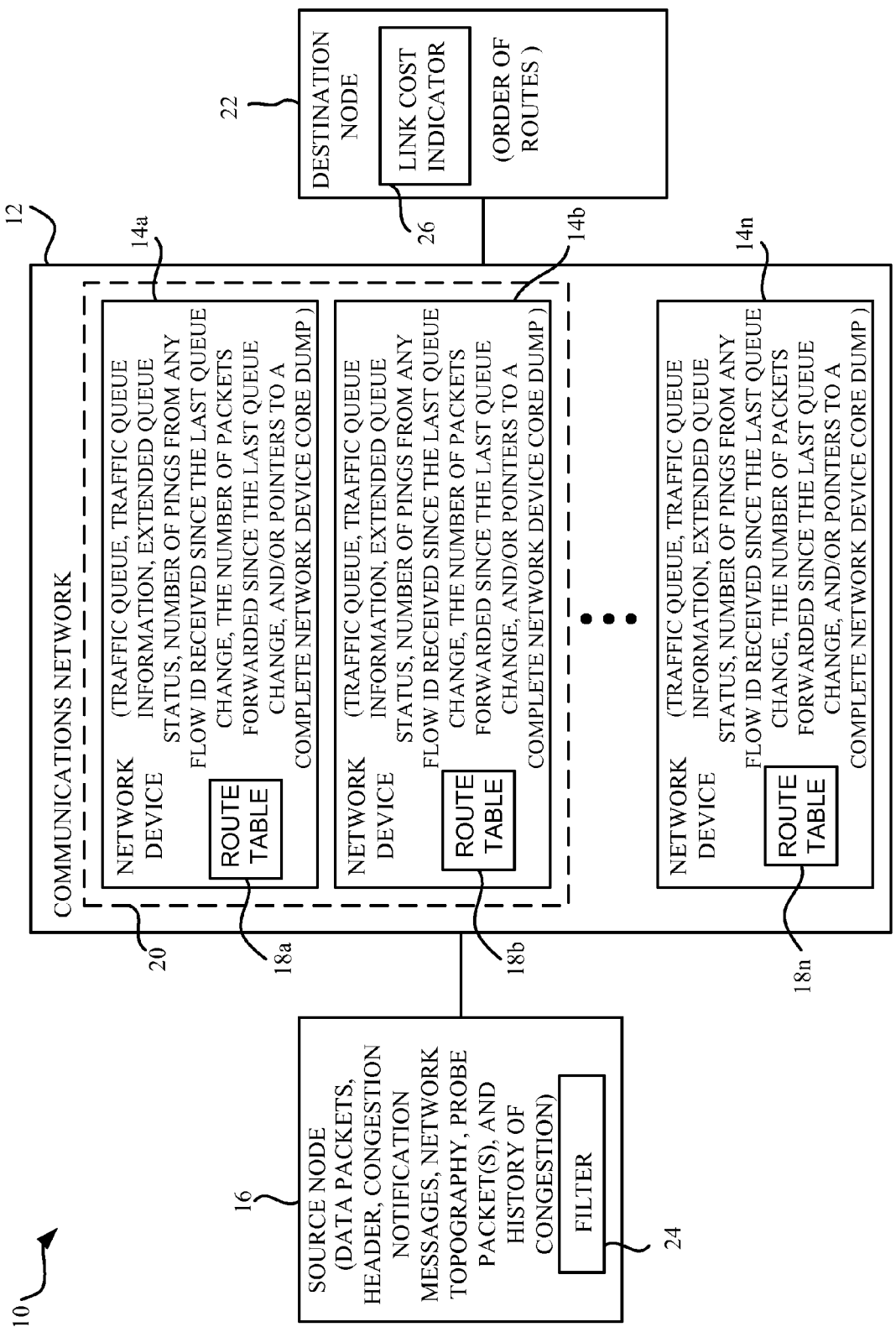
FIG. 1 is a schematic block diagram of a system to investigate congestion in a computer network in accordance with the invention.

With reference now to FIG. 1, a system 10 to investigate congestion in a computer network 12 is initially described. The system 10 is a programmable apparatus that stores and manipulates data according to an instruction set as will be appreciated by those of skill in the art.

In one embodiment, the system 10 includes a communications network(s) 12, which enables a signal, e.g. data packet, probe packet, and/or the like, to travel anywhere within, or outside of, system 10. The communications network 12 is wired and/or wireless, for example. The communications network 12 is local and/or global with respect to system 10, for instance.

The system 10 includes network devices 14a-14n to route data packets throughout the network 12. The network devices 14a-14n are computer network equipment such as switches, network bridges, routers, and/or the like. The network devices 14a-14n can be connected together in any configuration to form the communications network 12, as will be appreciated by those of skill in the art.

The system 10 may further include a source node 16 that sends data packets to any of the network devices 14a-14n. There can be any number of source nodes 16 in the system 10. The source node 16 is any piece of computer equipment that is able to send data packets to the network devices 14a-14n.

The system 10 can also include a routing table 18a-18n at each respective network device 14a-14n. In another embodiment, the route the data packets are sent by any network device 14a-14n is based upon each respective routing table 18a-18n.

The network devices 14a-14n can be members of at least one virtual local area network 20. The virtual local area network 20 permits the network devices 14a-14n to be configured and/or reconfigured with less regard for each network devices' 14a-14n physical characteristics as such relates to the communications network's 12 topology, as will be appreciated by those of skill in the art. In another embodiment, the source node 16 adds a header to the data packets in order to define the virtual local area network 20.

In one embodiment, the source node 16 sends a probe packet(s) to the network devices 14a-14n to gather information about the traffic queues at each network device that receives the probe packet(s). The routing table 18a-18n at each network device 14a-14n that receives the probe packet may be based upon the gathered information for each respective traffic queue.

In one embodiment, the network devices 14a-14n are members of at least one virtual local area network 20. In another embodiment, the probe packets include a layer 2 flag and/or sequence/flow/source node IDs.

Each network device 14a-14n can ignore the probe packet if it is busy. In one configuration, at least one of the network devices 14a-14n provides its extended queue status to the source node 16 in response to receiving the probe packet.

One of the network devices 14a-14n may provide its extended queue status to other network devices in response to receiving the probe packet. The extended queue status can include the number of pings from any flow ID received since the last queue change, the number of packets forwarded since the last queue change, and/or pointers to a complete network device core dump.

In one embodiment, if an extended queue status exceeds a threshold level, the source node 16 updates the routing table 18a-18n to rebalance traffic loads within the VLAN 20. The probe packet can be sent in response to the source node 16 receiving a threshold number of congestion notification messages in a given time interval.

In one embodiment, the system 10 additionally includes a destination node 22 that works together with the source node 16 to determine the route the data packets follow through network 12. There can be any number of destination nodes 22 in system 10.

The source node 16 may be configured to collect congestion notification messages from the network devices 14a-14n, and map the collected congestion notification messages to the network topology. The system 10 may also include a filter 24 that controls which portions of the congestion notification messages from the network devices 14a-14n are used by the source node 16. Thus, the source node 16 can route around any network device 14a-14n for which the collected congestion notification messages reveal a history of congestion.

In one embodiment, the source node 16 routes to, or around, any network device 14a-14n based upon a link cost indicator 26. The system 10 can further include a destination node 22 that selects the order of the routes.

Figure 2:
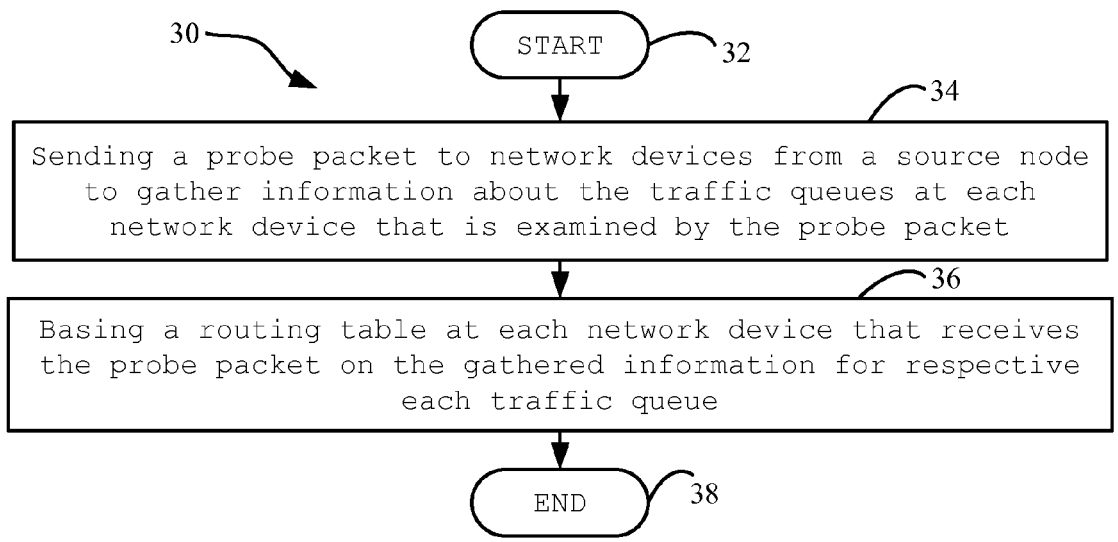
FIG. 2 is a flowchart illustrating method aspects according to the invention.

Another aspect of the invention is a method to investigate congestion in a computer network 12, which is now described with reference to flowchart 30 of FIG. 2. The method begins at Block 32 and may include sending a probe packet to network devices from a source node to gather information about the traffic queues at each network device that is examined by the probe packet at Block 34. The method may also include basing a routing table at each network device that receives the probe packet on the gathered information for respective each traffic queue at Block 36. The method ends at Block 38.

Figure 3:
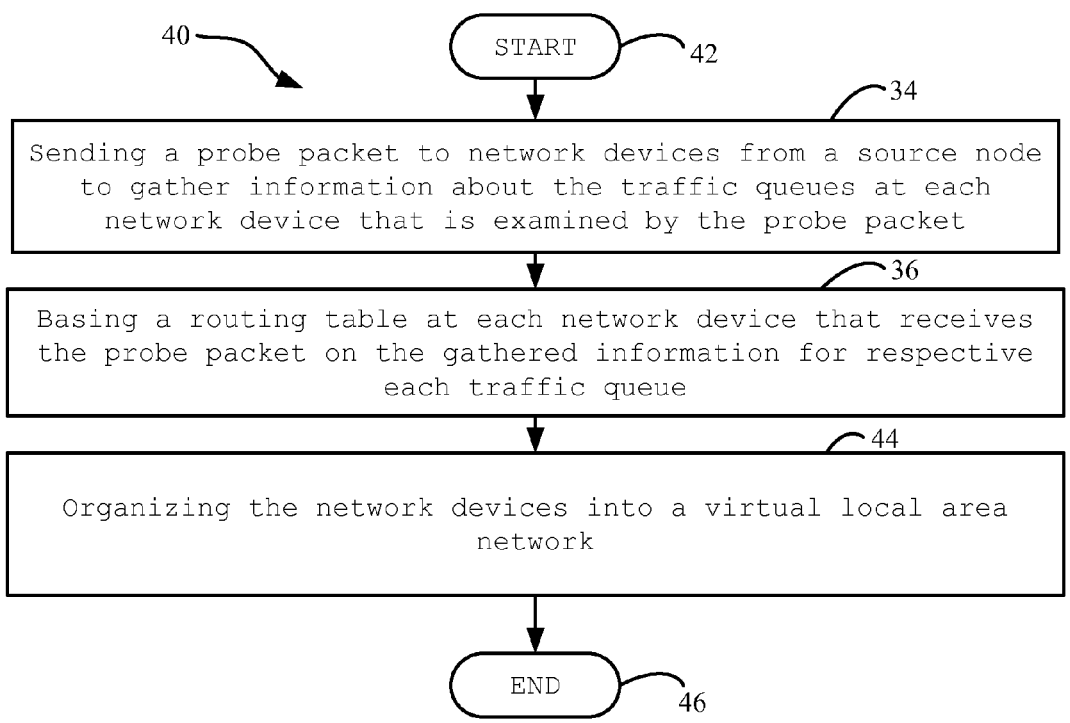
FIG. 3 is a flowchart illustrating method aspects according to the method of FIG. 2.

In another method embodiment, which is now described with reference to flowchart 40 of FIG. 3, the method begins at Block 42. The method may include the steps of FIG. 2 at Blocks 34 and 36. The method may additionally include organizing the network devices into a virtual local area network at Block 44. The method ends at Block 46.

Figure 4:
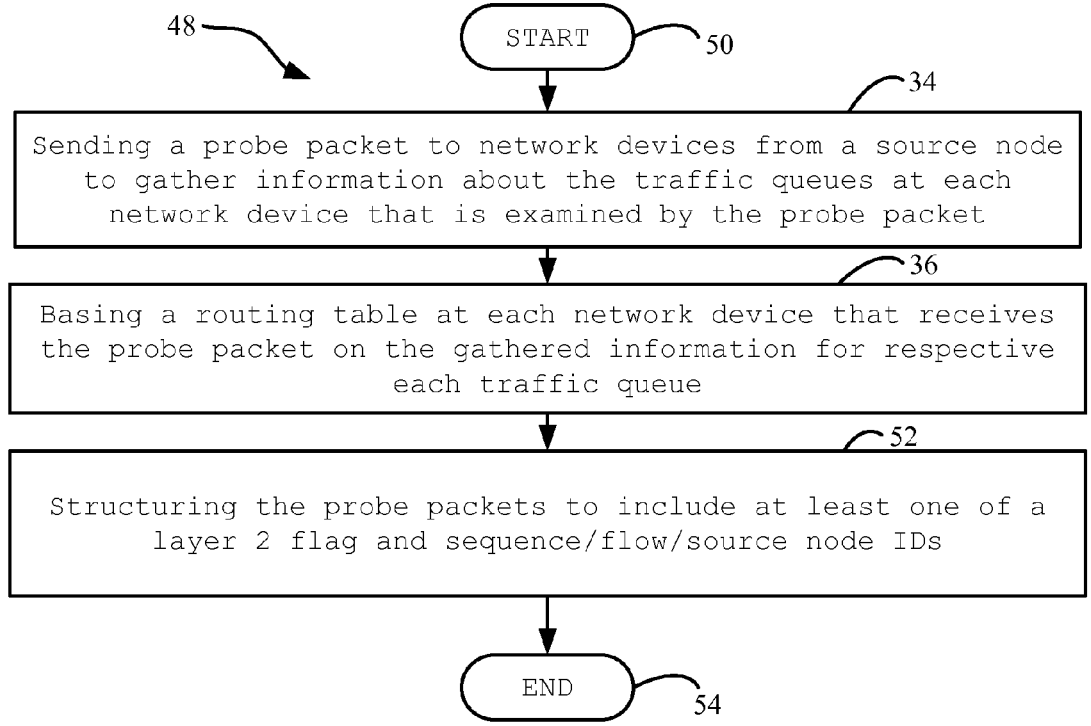
FIG. 4 is a flowchart illustrating method aspects according to the method of FIG. 2.

In another method embodiment, which is now described with reference to flowchart 48 of FIG. 4, the method begins at Block 50. The method may include the steps of FIG. 2 at Blocks 34 and 36. The method may additionally include structuring the probe packets to include at least one of a layer 2 flag and sequence/flow/source node IDs at Block 52. The method ends at Block 54.

Figure 5:
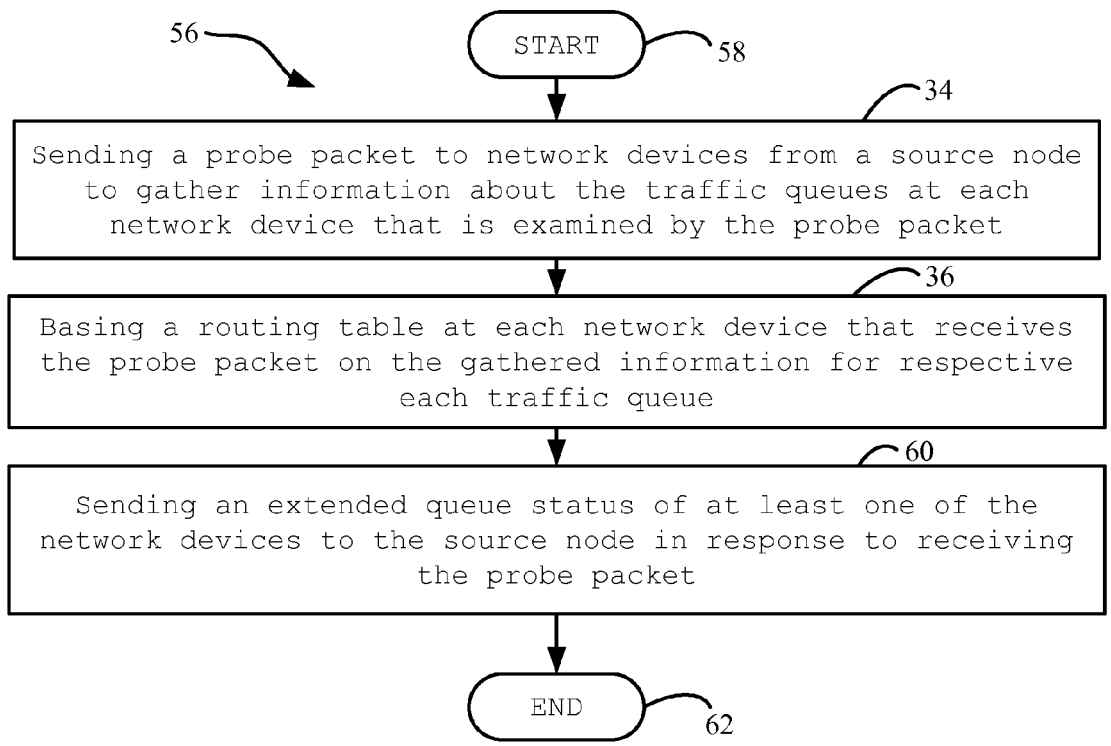
FIG. 5 is a flowchart illustrating method aspects according to the method of FIG. 2.

In another method embodiment, which is now described with reference to flowchart 56 of FIG. 5, the method begins at Block 58. The method may include the steps of FIG. 2 at Blocks 34 and 36. The method may additionally include sending an extended queue status of at least one of the network devices to the source node in response to receiving the probe packet at Block 60. The method ends at Block 62.

Figure 6:
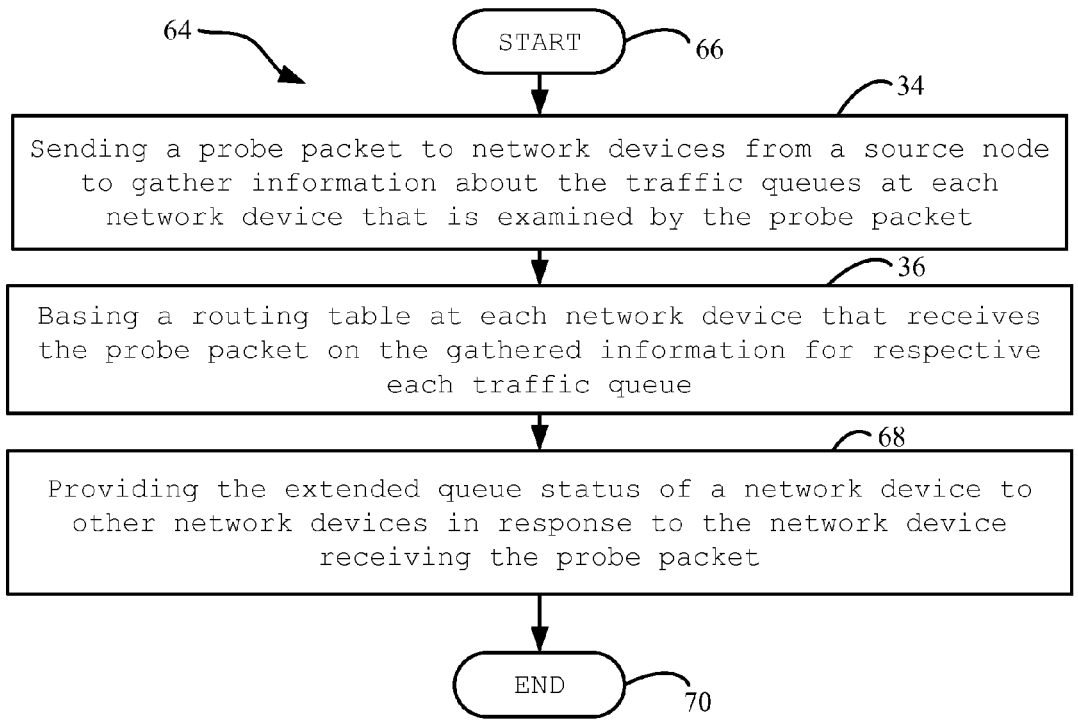
FIG. 6 is a flowchart illustrating method aspects according to the method of FIG. 2.

In another method embodiment, which is now described with reference to flowchart 64 of FIG. 6, the method begins at Block 66. The method may include the steps of FIG. 2 at Blocks 34 and 36. The method may additionally include providing the extended queue status of a network device to other network devices in response to the network device receiving the probe packet at Block 68. The method ends at Block 70.

Figure 7:
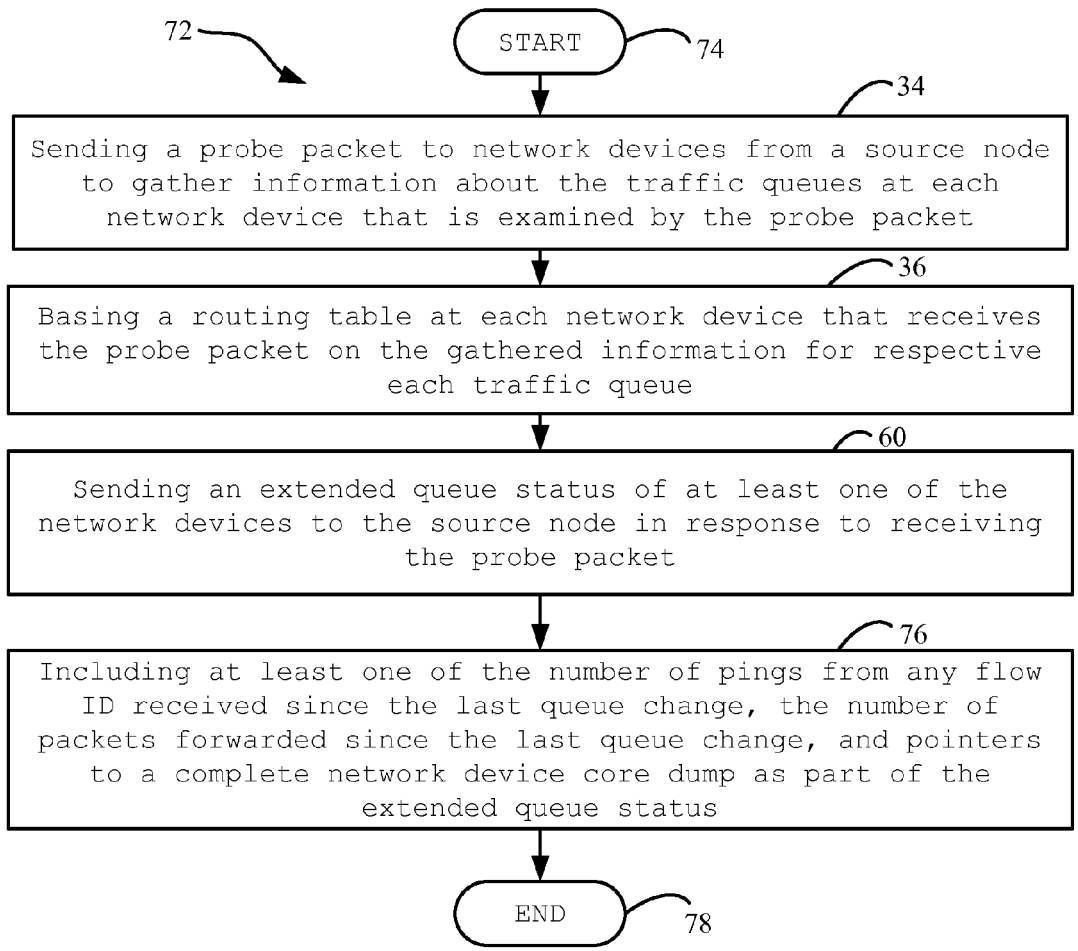
FIG. 7 is a flowchart illustrating method aspects according to the method of FIG. 5.

In another method embodiment, which is now described with reference to flowchart 72 of FIG. 7, the method begins at Block 74. The method may include the steps of FIG. 5 at Blocks 34, 36, and 60. The method may additionally comprise including at least one of the number of pings from any flow ID received since the last queue change, the number of packets forwarded since the last queue change, and/or pointers to a complete network device core dump as part of the extended queue status at Block 76. The method ends at Block 78.

Figure 8:
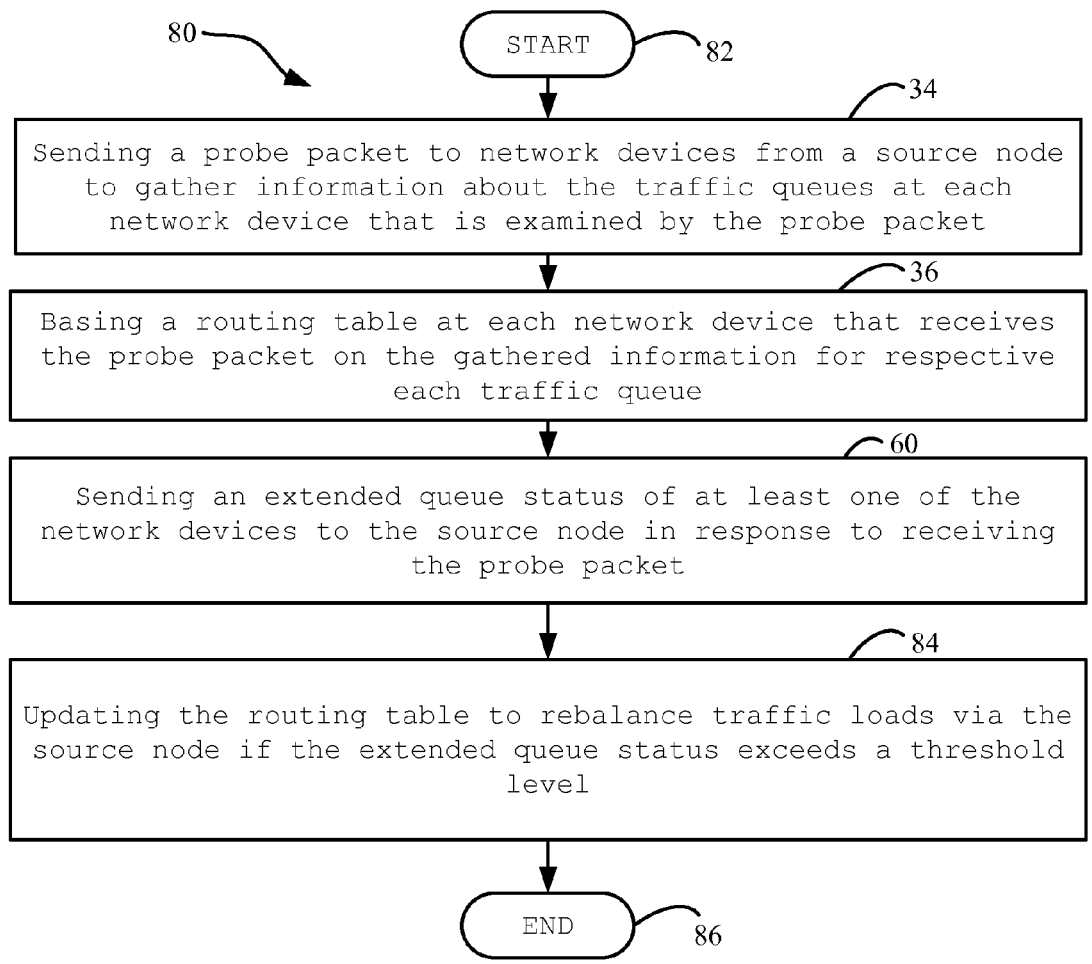
FIG. 8 is a flowchart illustrating method aspects according to the method of FIG. 2.

In another method embodiment, which is now described with reference to flowchart 80 of FIG. 8, the method begins at Block 82. The method may include the steps of FIG. 5 at Blocks 34, 36, and 60. The method may additionally include updating the routing table to rebalance traffic loads via the source node if the extended queue status exceeds a threshold level at Block 84. The method ends at Block 86.

In view of the foregoing, the system 10 addresses the investigation of congestion in computer networks 12. For example, large converged networks are prone to congestion and poor performance because they cannot sense and react to potential congestion conditions. System 10 provides a proactive scheme for probing network congestion points, identifying potential congestion areas in advance, and/or preventing them from forming by rerouting traffic along different paths.

In other words, system 10 uses proactive source-based routing, which incorporates an active feedback request command that takes snapshots of the state of the network and uses this information to prevent congestion or other traffic flow problems before they occur. In this approach the source node 16, e.g. traffic source, actively monitors the end-to-end traffic flows by inserting a probing packet, called "feedback request", into the data stream at periodic intervals. This probe packet will traverse the network 12 (the VLANs plus any alternative paths) and collect information on the traffic queue loads.

In one embodiment, system 10 does not require congestion notification messages ("CNM") in order to work. In another embodiment, in a network which uses CNMs, the probing can also be triggered by a source having received more than a certain number of CNMs in a given time interval.

A related problem in converged networks is the monitoring and control of adaptive routing fabrics. Most industry standard switches are compliant with IEEE 802.1Qau routing mechanisms. However, they fail to offer a means for delivering adaptive feedback information to the traffic sources before congestion arises in the network.

System 10 addresses the foregoing and greatly enhances the speed of congestion feedback on layer 2 networks, and provides the new function of anticipating probable congestion points before they occur.

In one embodiment, the source node 16 autonomously issues a feedback request command. In another embodiment, the source node 16 begins to issue feedback request after receiving a set number of congestion notification messages, e.g. as defined in Quantized Congestion Notification (QCN). When feedback requests are returned, system 10 can either count the number of responses per flow ID (stateful approach) or allow the responses to remain anonymous (stateless approach).

In one embodiment, the source node 16 injects a feedback request packet into the network 12 with a layer 2 flag and sequence/flow/RP IDs. The network device 14a-14n receives the feedback request. If the network device 14a-14n is busy it may disregard the request, if not, it increments a counter indicating that a feedback request packet has been received. The network device 14a-14n then dumps its extended queue status information and returns this data back to the source node 16 that originated the feedback request packet. In another embodiment, the network device 14a-14n may also be set to forward the feedback request to other nodes in the network 12.

In one embodiment, the extended queue status may include the number of pings from any flow ID received since the last queue change, the number of packets forwarded since the last queue change, and/or the pointers to a complete CP core dump.

In one embodiment, the feedback requests may be triggered by QCN frames, so that any rate-limiting traffic flows are probed. For example, system 10 might send one feedback request frame for every N kilobytes of data sent per flow (e.g. N=750 kB). This provides the potential for early response to pending congestion points. Using the information obtained from feedback requests, source adaptive routing may be employed to stop network 12 congestion before it happens. This information also makes it possible to optimize traffic flows according to latency, throughput, or other user requirements.

In one embodiment, system 10 uses QCN messaging on a converged network. The detailed queue information is already available in the network device 14a-14n, e.g. switch CP, but it needs to be formatted and collected by the source node 16.

The performance overhead has been demonstrated to be less than 1% for feedback request monitoring in software. The overhead limits can be further reduced if desired by allowing the source node 16 and network devices 14a-14n to adjust the frequency of feedback control requests. This approach is further enhanced the value of enabled switch fabrics and allows for more effective use of source based adaptive routing.

In one embodiment, in a CEE/FCoE network 12 having a plurality of VLANs 20 each having a plurality of network devices 14a-14n, e.g. switches, which enable paths over which traffic can be routed through the network, a method for locating potential congestion points in the network is described.

As noted above, large converged networks do not define adequate means to control network congestion, leading to traffic delays, dropped data frames, and poor performance. The conventional hop-by-hop routing is not efficient at dealing with network congestion, especially when a combination of storage and networking traffic is placed over a common network, resulting in new and poorly characterized traffic statistics. If the benefits of converged networking are to be realized, a new method of traffic routing is required. To address such, system 10 uses a source based, reactive, and adaptive routing scheme.

In one embodiment, system 10 adds a virtual LAN (VLAN) 20 routing table 18a-18n in every network device 14a-14n, e.g. switches. The VLAN 20 is defined by a 12 bit header field appended to all packets (hence this is a source-based routing scheme), plus a set of routing table 18a-18n entries (in all the switches) that can route the VLANs.

The 12 bit VLAN 20 ID is in addition to the usual packet header fields, and it triggers the new VLAN 20 routing scheme in each network device 14a-14n. Each network device 14a-14n has its own routing entry for every active VLAN 20.

In one embodiment, source node 16 and destination node 22 use a global selection function to decide the optimal end-to-end path for the traffic flows. The optimal end-to-end path is then pre-loaded into the network devices 14a-14n, e.g. switches, which are members of this VLAN 20.

In one embodiment, the VLAN 20 table 18a-18n is adaptive and will be periodically updated. The refresh time of the routing table 18a-18n can be varied, but will probably be at least a few seconds for a reasonably large number (4,000 or so) of VLANs 20. The data traffic subject to optimization will use the VLANs 20 as configured by the controlling sources/applications 16.

In one embodiment, congestion notification messages (CNMs) from the network devices 14a-14n, e.g. fabric switches, are collected by the traffic source 16, marking the switch and port locations based on the port ID.

Every traffic source 16 builds a history of CNMs that it has received, which is mapped to the network topology. Based on the source's 16 historical mapping of global end-to-end paths, the source will reconfigure any overloaded paths, defined by the VLAN 20 tables 18a-18n, to route around the most persistent congestion points (signaled by the enabled switches).

In one embodiment, for each destination, the source 16 knows all the possible paths a packet can take. The source 16 can then evaluate the congestion level along each of these paths and choose the one with the smallest cost, and therefore the method is adaptive.

In another embodiment, the order in which the paths are selected is given by the destination 22. In the case that no CNMs are received, the source 16 will default to the same path used by conventional and oblivious methods.

In one embodiment, if the default path is congested, the alternative paths are checked next (by comparing their congestion cost), starting with the default one, in a circular search, until a non-congested path is found. Otherwise, the first path with the minimum congestion cost is chosen.

In another embodiment, the CNMs are used as link cost indicators 26. System 10 defines both a global and local method of cost weighting, plus a filtering scheme to enhance performance.

In this manner, system 10 can determine where the most congested links are located in the network 12. For each destination 22, the source 16 knows all the possible paths a packet can take. The source 16 can then evaluate the congestion level along each of these paths and choose the one with the smallest cost and therefore the method is adaptive.

In one embodiment, the system 10 uses at least one of two different methods of computing the path cost. The first is a global price, which is the (weighted) sum of the congestions levels on each link of the path. The other is the local price, which is the maximum (weighted) congestion level of a link of the path.

The intuition behind the local price method is that a path where a single link experiences heavy congestion is worse than a path where multiple links experience mild congestion. On the other hand, a path with two heavily congested links is worse than a path with a single heavily congested link.

The intuition behind using a global price method is that the CNMs received from distant network devices 14a-14n, e.g. switches, are more informative than those received from switches that are close to the source 16. This happens because the congestion appears on the links that are likely to concentrate more flows (i.e. the links that are farther away from the source).

In one embodiment, to avoid high frequency noise which could lead to instabilities in the network devices $14a$-$14n$, e.g. switch, updating process, the system 10 applies filter 24 to the incoming stream of CNMs. The filter 24 is a low pass filter, for example. The filter 24 would have a running time window to average and smooth the CNM stream.

In one embodiment, periodically the source 16 will refresh, and if necessary, update the VLAN 20 path information in the affected network devices $14a$-$14n$. In another embodiment, the optimal path routing is calculated by the end points, e.g. source 16 and destination 22, and refreshed periodically throughout the switch fabric.

The system 10 can be implemented in hardware, software, and/or firmware. Another aspect of the invention is a computer readable program codes coupled to tangible media to investigate congestion in a computer network 12. The computer readable program codes may be configured to cause the program to send a probe packet to network devices $14a$-$14n$ from a source node 16 to gather information about the traffic queues at each network device that is examined by the probe packet. The computer readable program codes may also base a routing table $18a$-$18n$ at each network device $14a$-$14n$ that receives the probe packet on the gathered information for respective each traffic queue.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
   receiving, by a source node, congestion notification messages from network devices within a virtual local area network;
   filtering portions of the congestion notification messages used by the source node, wherein the filtering is performed by a low pass filter;
   sending a probe packet to network devices from the source node to gather information about traffic queues at each network device that is examined by the probe packet, wherein the probe packet is sent in response to the source node receiving a threshold number of the congestion notification messages in a given time interval, wherein the probe packet includes a layer 2 flag and a sequence ID, a flow ID, and a source node ID;
   basing a routing table at each network device that receives the probe packet on the gathered information for respective each traffic queue;
   sending an extended queue status of at least one of the network devices to the source node in response to receiving the probe packet, wherein the extended queue status includes a number of pings from any flow ID received since a last queue change, a number of packets forwarded since the last queue change, and pointers to a complete network device core dump;
   sending the extended queue status of at least one of the network devices to other network devices in response to receiving the probe packet;
   updating, by the source node, the routing table at each network device to rebalance traffic loads in response to the extended queue status exceeding a threshold level; and
   adjusting how frequently subsequent probe packets are sent.

2. The method of claim 1, further comprising organizing the network devices into a virtual local area network.

3. The method of claim 1, further comprising providing the extended queue status of a network device to other network devices in response to the network device receiving the probe packet.

4. A system comprising:
   network devices to route data packets throughout a network;
   a source node to:
      receive congestion notification messages from network devices within a virtual local area network;
      filter portions of the congestion notification messages used by the source node, wherein the filtering is performed by a low pass filter; and
      send a probe packet to the network devices to gather information about traffic queues at each network device that receives the probe packet, wherein the probe packet is sent in response to the source node receiving a threshold number of the congestion notification messages in a given time interval, wherein the probe packet includes a layer 2 flag and a sequence ID, a flow ID, and a source node ID, where a frequency of sending subsequent probe packets is adjusted;
   a routing table at each network device that receives the probe packet, and the routing table is based upon the gathered information for each respective traffic queue; and
   an extended queue status of at least one of the network devices configured to be sent to the source node in response to receiving the probe packet, wherein the extended queue status includes a number of pings from any flow ID received since a last queue change, a number of packets forwarded since the last queue change, and pointers to a complete network device core dump, the extended queue status of at least one of the network devices is configured to be sent to other network devices in response to receiving the probe packet;
   wherein the source node is configured to update the routing table at each network device to rebalance traffic loads in response to the extended queue status exceeding a threshold level.

5. The system of claim 4, wherein the network devices are members of at least one virtual local area network.

6. The system of claim 4, wherein each network device can ignore the probe packet if it is busy.

7. A computer program product embodied in a non-transitory tangible media comprising:
   computer readable program codes coupled to the tangible media to investigate congestion in a computer network, the computer readable program codes configured to cause the program to:
      receive, by a source node, congestion notification messages from network devices within a virtual local area network;
      filter portions of the congestion notification messages used by the source node, wherein the filtering is performed by a low pass filter;
      send a probe packet to network devices from the source node to gather information about traffic queues at each network device that is examined by the probe packet, wherein the probe packet is sent in response to the source node receiving a threshold number of the congestion notification messages in a given time interval, wherein the probe packet includes a layer 2 flag and a sequence ID, a flow ID, and a source node ID;

base a routing table at each network device that receives the probe packet on the gathered information for each respective traffic queue;

send an extended queue status of at least one of the network devices to the source node in response to receiving the probe packet, wherein the extended queue status includes a number of pings from any flow ID received since a last queue change, a number of packets forwarded since the last queue change, and pointers to a complete network device core dump;

send the extended queue status of at least one of the network devices to other network devices in response to receiving the probe packet;

update, by the source node, the routing table at each network device to rebalance traffic loads in response to the extended queue status exceeding a threshold level; and adjust how frequently subsequent probe packets are sent.

8. The computer program product of claim 7, wherein the network devices are members of at least one virtual local area network.

9. The computer program product of claim 7, wherein each network device can ignore the probe packet if it is busy.

* * * * *